(12) United States Patent
Anderson

(10) Patent No.: US 7,444,027 B2
(45) Date of Patent: Oct. 28, 2008

(54) METHODS, DEVICES, AND SYSTEMS FOR CREATING AND COMPRESSING MULTI-LEVEL HALFTONES

(75) Inventor: Peter G. Anderson, Pittsford, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1068 days.

(21) Appl. No.: 10/303,180

(22) Filed: Nov. 25, 2002

(65) Prior Publication Data

US 2004/0100644 A1 May 27, 2004

Related U.S. Application Data

(63) Continuation-in-part of application No. 10/292,163, filed on Nov. 12, 2002, now Pat. No. 7,245,778.

(51) Int. Cl.
*G06K 9/36* (2006.01)
(52) U.S. Cl. .................................. 382/237; 382/3.06
(58) Field of Classification Search ................ 382/323, 382/246, 237, 251; 358/1.2, 1.9, 3.01, 3.06
See application file for complete search history.

(56) References Cited

U.S. PATENT DOCUMENTS

| 5,297,220 | A | | 3/1994 | Nomizu |
| 5,555,103 | A | | 9/1996 | Anderson |
| 6,026,196 | A | | 2/2000 | Shannon et al. |
| 6,278,802 | B1 | * | 8/2001 | Delabastita et al. .......... 382/251 |
| 6,330,362 | B1 | | 12/2001 | Venkateswar |
| 6,519,055 | B1 | * | 2/2003 | Curry et al. ................... 358/2.1 |
| 7,245,778 | B2 | * | 7/2007 | Anderson et al. ............ 382/246 |
| 2004/0091163 | A1 | * | 5/2004 | Anderson et al. ............ 382/246 |

FOREIGN PATENT DOCUMENTS

| EP | 0188800 B1 | 5/1991 |
| EP | 0449528 B1 | 12/1995 |
| EP | 0590923 B1 | 1/1999 |

OTHER PUBLICATIONS

International Search Report, May 27, 2004 (6 pgs.).
Denecker, Koen, et al., "A Comparative Study of Lossless Coding Techniques for Screened Continuous-Tone Images", (4 pages) 1997 IEEE International Conference on Acoustics, Speech, and Signal Processing (ICASSP'97)-vol. 4, 1997.
Denecker, Koen, et al., "Software and Hardware Implementation of an Improved Lossless Halftone Image Compression Algorithm", (4 pages), International Congress on Imaging Science, Electronic Imaging, vol. 2, (Antwerp, Belgium), pp. 263-267, Sep. 1998.
Denecker, Koen, et al., "Design of an Improved Lossless Halftone Image Compression Codec" Signal Processing: Image Communication 17 pp. 277-292 (2002).
Kang, Henry R., "Dispersed-Dot Ordered Dither", Digital Color Halftoning, E.R. Dougherty, ed., International Society of Optical Engineering and Institute of Electrical and Electronics Engineers, Inc., pp. 279-294 (1999).
Sayood, Kahlid, "Huffman Coding", Introduction to Data Compression, 2nd Ed., Fox, E., Ed., Morgan Kaufmann Publishers, pp. 39-54 (2000).
Ulichney, Robert, "Dispersed-Dot Ordered Dither", Digital Halftoning, The Massachusetts Institute of Technology, pp. 127-142 (1987).

* cited by examiner

*Primary Examiner*—Duy M Dang

(57) ABSTRACT

Methods, devices and systems for compressing images are provided. One method includes creating halftone mask structures and applying compression coding techniques to arrayed pixels sorted using the halftone mask structures in order to convert an image to a compressed multi-level, halftoned image.

6 Claims, 7 Drawing Sheets

$$C^{(0)} = \begin{bmatrix} 90 & 82 & 74 & 58 & 42 & 34 & 36 & 44 & 60 & 76 & 84 & 92 & 100 & 108 & 116 & 132 & 148 & 156 & 154 & 146 & 130 & 114 & 106 & 98 \\ 66 & 50 & 26 & 18 & 10 & 2 & 4 & 12 & 20 & 28 & 52 & 68 & 124 & 140 & 164 & 172 & 180 & 188 & 186 & 178 & 170 & 162 & 138 & 122 \\ 70 & 54 & 30 & 22 & 14 & 6 & 0 & 8 & 16 & 24 & 48 & 64 & 120 & 136 & 160 & 168 & 176 & 184 & 190 & 182 & 174 & 166 & 142 & 126 \\ 94 & 86 & 78 & 62 & 46 & 38 & 32 & 40 & 56 & 72 & 80 & 88 & 96 & 104 & 112 & 128 & 144 & 152 & 158 & 150 & 134 & 118 & 110 & 102 \\ 101 & 109 & 117 & 133 & 149 & 157 & 155 & 147 & 131 & 115 & 107 & 99 & 91 & 83 & 75 & 59 & 43 & 35 & 37 & 45 & 61 & 77 & 85 & 93 \\ 125 & 141 & 165 & 173 & 181 & 189 & 187 & 179 & 171 & 163 & 139 & 123 & 67 & 51 & 27 & 19 & 11 & 3 & 5 & 13 & 21 & 29 & 53 & 69 \\ 121 & 137 & 161 & 169 & 177 & 185 & 191 & 183 & 175 & 167 & 143 & 127 & 71 & 55 & 31 & 23 & 15 & 7 & 1 & 9 & 17 & 25 & 49 & 65 \\ 97 & 105 & 113 & 129 & 145 & 153 & 159 & 151 & 135 & 119 & 111 & 103 & 95 & 87 & 79 & 63 & 47 & 39 & 33 & 41 & 57 & 73 & 81 & 89 \end{bmatrix}$$

*Fig. 8*

METHODS, DEVICES, AND SYSTEMS FOR CREATING AND COMPRESSING MULTI-LEVEL HALFTONES

The application is a Continuation-In-Part of U.S. application Ser. No. 10/292,163, filed Nov. 12, 2002 now U.S. Pat. No. 7,245,778, the specification of which is incorporated herein by reference.

FIELD

The present invention relates to printer technologies, and in particular to methods, devices, and systems for compressing images.

BACKGROUND

Electrophotographic printers (i.e. laser printers) operate by exposing a charged photoconductive surface, typically the surface of a drum or plate, to laser light. In places that are contacted by the laser light, the electrostatic charge dissipates and certain types of toner particles adhere. These particles are then transferred to the surface of a piece of media, such as paper, plastic, and the like. Many printers may expose dots as small as $\frac{1}{1,200}$ of a square inch to laser light. However, isolated dots of these small sizes cannot be reliably printed because the toner may not reliably adhere. Therefore, the resulting images may be objectionably "noisy" in their appearance.

To alleviate this problem, dots are typically printed in clusters having a larger cumulative size such as, for example, $\frac{1}{150}$ of a square inch. These clusters can also be referred to as macro-dots. Although the laser printer toner may not be able to reliably adhere at $\frac{1}{1,200}$ of a square inch resolution, the device can address the positioning of a cluster of dots to a resolution of $\frac{1}{1,200}$ of a square inch and allows for high addressability and precision in placement of the clusters it produces, so the technology of these machines provides image quality advantages.

Since production of smaller dots will not likely increase the definition of the image due to the above problems, an alternative to working toward controlling the application of fine dots, such as those approximately $\frac{1}{1,200}$ of a square inch, is to control the output of the laser during the formation of a cluster. This is accomplished by turning the laser on and off during a period when the cluster is formed on the photoconductive surface. In this way, the size of the macro dots, or clusters, can be made slightly larger or smaller.

Many laser and inkjet printers currently produced cannot print the many shades of gray or color (typically 256 or more shades) that are necessary to simulate continuous grayscale or multi-color images, also referred to as contone images. These printers typically only print utilizing one color ink, e.g. cyan, magenta, yellow or black ink and, therefore, at a given space on a page, the printer can either leave the space blank or place a dot of ink thereon. By changing the density of dots, or the size of the dots, on areas of the page, the simulation of contone images can be made. This process of mimicking a contone image through use of varied densities of dots is referred to as halftoning. In halftoning, the image being created is defined into a plurality of small cells. A number of dots are then arranged in a pattern within the cell. The number and the pattern of the dots are dependent upon the particular shade of gray or color that is to be simulated and upon the type of halftoning that is being utilized.

Originally, a halftoning procedure was performed by means of a screen, i.e. "screening." With today's increase in the power of computers, halftoning is more and more frequently performed in a digital fashion by raster image processors (RIPs). The halftoning operation is a computationally intensive application, and the resulting image sizes are large, since in forming the image a pattern of dots representing a shade of gray must be mapped rather than, for example, just a reference to the particular shade of gray that is required in a portion of a grayscale image.

In order to simulate variable-sized halftone dots in computer printers, dithering is used, which creates clusters of dots in a halftone cell. The more dots printed in the cell, the darker the shade of gray that is depicted. As the screen frequency gets higher (i.e. more cells per inch), there is less room for dots in the cell, reducing the number of shades of gray or color that can be generated.

In low resolution printers, there is always a compromise between printer resolution (dots per inch or dpi) and screen frequency (lines per inch or lpi), which is the number of rows of halftone cells per inch. For example, in a 300 dpi printer, the 8×8 halftone cell required to create 64 shades of gray results in a very coarse 38 lines per inch of screen frequency (300 dpi divided by 8). However, a high resolution, 2,400 dpi printer can easily provide the appearance of 256 shades of gray at 150 lpi (2,400/16). At this resolution, the human viewer cannot distinguish black and white dots from continuous gray.

Halftone images, also called bi-level or multi-level images, tend to be very large. That is, the image can range from a few megabits (Mbit) up to several gigabits (Gbit). When images are screened at a high resolution, the size of the halftone image can be several times larger than the size of the original contone image. Hence, storage and transmission of these images can benefit from compression.

However, halftones are not typically compressible, and the methods that have been developed to date often resort to a loss of image information during the compression process called "lossy compression". Previous methods to compress halftone images may act to convolve the images with low-pass filters to convert them back to contone images which are then compressed with such well-known techniques such as JPEG, but this technique is a lossy compression method and therefore results in a loss of image information and quality.

High-resolution digital printers and growing computational requirements associated with new applications, such as printing-on-demand and personalized printing have increased the need for fast and efficient lossless halftone image compression.

BRIEF DESCRIPTION OF THE DRAWINGS

FIG. 8 is an example of a matrix for use in various embodiments of the present invention.

DETAILED DESCRIPTION

Figure 1:
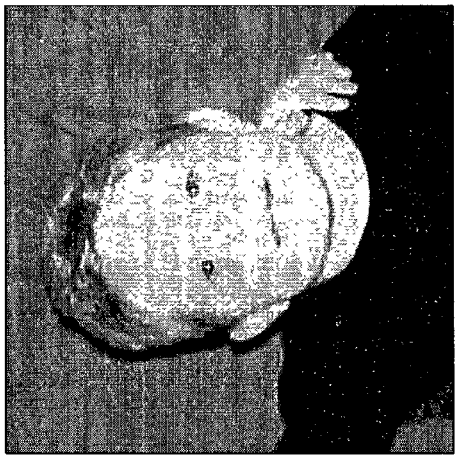
FIG. 1 is a printed representation of a contone image, represented as image I herein.
Figure 2:
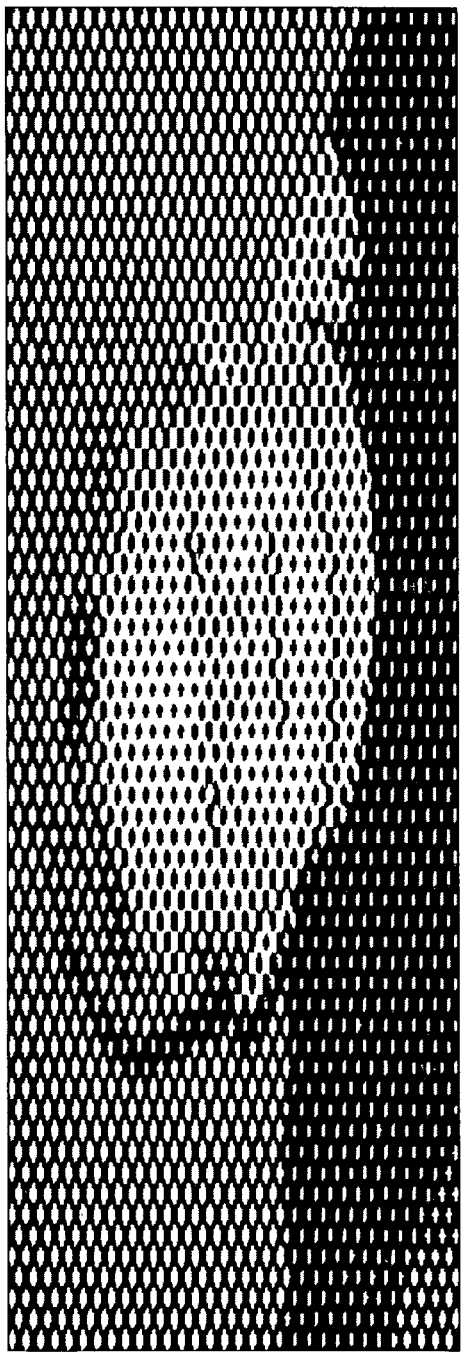
FIG. 2 is a visual representation of one embodiment of an elongated halftone image B'.

The present invention provides a technique for converting continuous gray-scale images or multi-colored images, such as the image in FIG. 1, to halftone images in a manner that lend themselves to lossless data compression with a compression factor of two or better. This technique also uses novel halftone mask structures with non-repeated threshold values that can be used as a sort key to permit a reversible rearrangement of image pixels into groups with a highly skewed distribution allowing compression coding techniques to be applied.

In one embodiment, Huffman coding compression techniques are applied. However, the invention is not so limited. One of ordinary skill in the art and familiar with Huffman coding techniques or other standard compression-coding techniques will understand, upon reading this disclosure, the manner in which compression coding techniques can be applied to create the lossless halftone images of the present invention. One of ordinary skill in the art will further understand the manner in which a wide variety of other suitable statistical compression coding techniques can be applied to arrayed pixels sorted using the halftone mask structures of the invention to create lossless halftone images. The same are considered within the scope of the present invention.

Using the masks as a sort key allows the present invention to reversibly rearrange the image pixels and partition them into groups with a highly skewed distribution allowing compression coding techniques to be applied. The use of Huffman compression coding, for example, gives compression ratios in the range of 3:1 to 10:1.

Halftone images can be bi-level images made of two colors, such as black and white, formed using patterns whose detailed structures are nearly invisible. These images thus convey continuous tone pictures to human eyes. Halftone images can be created from a gray-scale or from a multicolor image. For example, in a color image the image can be broken down into the colors cyan, magenta, yellow, and black, and each color can be "halftoned" into a bi-level image, having either a dot of color or nothing in a given printed area. The same is true with respect to grayscale images. As one of ordinary skill in the art will appreciate from reading this disclosure, the techniques described herein can be applied to any of these four color planes. Halftone images' entropies tend to be very high and hence unsuitable for typical statistical approaches to data compression. Many halftone compression approaches involve converting the image back to a continuous image, then applying JPEG or a similar method. This process works to compress the image, but when the compressed image is decompressed, the image may be severely degraded ("lossy compression").

Other methods of compression include the utility xv which converts contone images to black and white using the Floyd-Steinberg algorithm. The Gnu or Unix "compress" utility can reduce the file sizes of the resulting images only slightly.

Additionally, other approaches to both lossy and lossless compression of halftoned images are reported. (See generally: Koen Denecker and Peter De Neve, *A comparative study of lossless coding techniques for screened continuous-tone images*, In B. Werner, editor, *Proceedings of the international conference on acoustics, speech, and signal processing (Munich Germany)*, volume 4, 1997; and Koen Denecker, Dimitrie Van De Ville, Frederik Habils, Ignace Lemahieu, and Adrian Munteanu, *Software and hardware implementation of an improved lossless halftone image compression algorithm*. In *International conference on imaging science, electronic imaging (Antwerp, Belgium)*, volume 2, 1998) which are herein incorporated by reference by reference in their entirety.

Multi-level Halftoning

Multi-level halftoning involves using 2 or more bits to describe each image pixel. The meaning of a two-bit pixel is interpreted by the printer as follows:

00—no ink is provided in the pixel;
01—⅓ of the pixel is provided with ink;
10—⅔ of the pixel is provided with ink;
11—the full pixel is provided with ink.

In a laser printer, this effect can be achieved by turning the laser on late or off early such that ⅓ or ⅔'s of the pixel can remain charged to receive toner. From the perspective of a viewer of the pixel, and in the case where a printer only uses a single color of ink, for example black on white paper, a pixel with a 00 two-bit value is white and a pixel with a 11 value is black, while pixels having values of 10 and 01 appear progressively less black. One approach to converting an image pixel to a multi-level halftone is to compare the pixel to three separate masks. If the pixel has a value that is:

less than all three masks, then the output is 00,
if it is less than two, then the output is 01,
if it is less than one, then the output is 10, and
if it is less than none, then the output is 11.

However, this method creates three masks and involves creating each mask, applying each mask to the pixel data, and calling up the next mask. The process, therefore, takes three compares to identify the output of each pixel.

Halftone Conversions via Masking

The present invention can be utilized with any number of multi-level bits, but, for the sake of simplicity, the present discussion will generally be limited to the four-level case (i.e. two-bit case). Those skilled in the art after reading this description and practicing the invention will understand how the present invention can be utilized with other multi-bit arrangements.

Instead of applying three different masks over each pixel of data, the present invention provides another approach, wherein the input and the printed images are sized to be three times as wide as they truly are, basically treating the pixel thirds as full pixels. In order to achieve this, the contone input image, defined for the sake of illustration as I, is elongated in one of its dimensions. For example, if I has dimensions H×W the elongation creates an image H×3W, represented as I' indicating that the image has been elongated. Although it is described in the above example that the image is elongated in one dimension, the invention is not so limited. The image may be elongated in height, width, or in both dimensions, and the letter W may be utilized to represent either the height or the width dimension. Furthermore, the computer software or hardware implementations may not actually create the intermediate image I'; the description is given in this manner for simplicity.

Elongation of the image I is accomplished by replication of each pixel N times, three times in the case of a two-bit embodiment. The selection of N is based upon the highest number that can be represented in an x-bit binary sequence. For example, in a two-bit sequence, the numbers 0-3 can be generated, hence N=3 for a two-bit embodiment, and in a three-bit sequence, the numbers 0-7 can be generated, so N=7.

In a row of an image I having pixels (a, b, c, ...) the resulting stretched image I' in a two-bit format would have pixels ($a_1, a_2, a_3, b_1, b_2, b_3, C_1, C_2, c_3, \ldots$). The pixels of image I and I' have values in a range according to the color level they produce. For example, a common range is from 0-1, wherein 1 is black and 0 is white and wherein the value can be any fraction or whole number including 0 and 1. Some examples include 0.5 grayscale wherein the pixel is a gray color halfway between white and black or 0.25 wherein the pixel is one quarter of the scale firm white to black. Any numbering range can be utilized to accomplish the present invention. For example, another range used in the art is from 0-255.

In the various embodiments, the stretched image I' is compared against one or more halftone masks. The one or more masks may be smaller than the size of the image I', or larger than the image I'. In this example, the mask is as large as the dimensions of the elongated image (i.e. H×3W). Each pixel of the elongated image I' is given a one-bit value of 0 or 1 based upon whether or not a corresponding threshold on the mask is met. The mask may contain any set of threshold values known in the art. One set of thresholds and masks formed therefrom is described herein.

In this way, a bi-level image, B', is thereby created having dimensions H×3W. The individual bits of B' (i.e. $a_1$, $a_2$, $a_3 \ldots$) correspond to the places where the laser will be on or off. B' is converted to B", an image of two-bit pixels d, by summing runs of three pixels, as in ($d_a = a_1 + a_2 + a_3$; $d_b = b_1 + b_2 + b_3$; $d_c = C_1 + C_2 + C_3, \ldots$). Therefore, B" is represented by ($d_a$, $d_b$, $d_c$, ...) and based upon the values of each $a_1$, $a_2$, $a_3 \ldots$ being either 0 or 1, the values of any element d will be either 0, 1, 2, or 3 in a two-bit embodiment. B' is converted to a multi-level halftone image B" by equating the values of each d, in a two-bit embodiment (i.e. the 0, 1, 2, 3 values), to two-bit binary numbers in the binary language (i.e. 00, 01, 10, or 11).

Halftone Masks

With regard to the construction and use of the mask, for the present discussion, input black and white (or one color and white, such as a single color plane from a multicolor image) images are used with any given image pixel $I_{pq}$ satisfying $0 < I_{pq} \leq 1$. For any given stretched image pixel $I'_{pq}$ its value is $0 \leq I'_{pq} \leq 1$. Similarly, all of the halftone mask values $M_{pq}$ satisfy $0 \leq M_{pq} \leq 1$, with a subscript range identical to the image's range. Any range of original values may be used for the above quantities $M_{pq}$, $I_{pq}$, and $I'_{pq}$, and then the quantities can be converted to a fraction or number within a common range, such that the numbers can be compared. Creation of a bi-level image, B', via a mask follows the rule:

$$I'_{pq} < M_{pq} \Rightarrow B'_{pq} = 0$$

$$I'_{pq} \geq M_{pq} \Rightarrow B'_{pq} = 1 \quad (1)$$

Generally, the halftone image, B', is expected to be such a high entropy mixture of black and white pixels that compression attempts are doomed. However, the rule of Eq. (1) suggests that the values of the $B'_{pq}$ are not truly random or disordered, namely $$M_{pq} = Pr[B'_{pq} = 0] \quad (2)$$

That is, when $M_{pq}$ is large, it is highly probable that $I'_{pq} < M_{pq}$, making $B'_{pq} = 0$.

Thus, according to the teachings of the present invention, by using masks with no repeated values, the pixels of B can be sorted using the values of M as a sort key. The observed tendency of one end of the sorted list to be predominantly 0's and the other end predominantly 1's can be exploited as Eq. 2 suggests. The rearranged pixel stream can be compressed. After decompression, the pixels can be rearranged to recover the original B' which can be converted to B" for printing.

Large masks of unique values will result in good bi-level images. These two goals do not conflict. In fact, for small clustered-dot masks, the unique value requirement is a benefit.

According to the teachings of the present invention, a computational rule, herein denoted by *, is defined that allows the combination of two matrices into a larger matrix. Specifically, if X and Y are matrices of dimensions $h_X \times w_X$ and $h_Y \times w_Y$, respectively, then $$Z = X * Y \quad (3)$$

is a matrix with dimensions $$h_Z = h_X w_Y$$

$$w_Z = w_X w_Y \quad (4)$$

Z is given by the rule $$Z_{ph_X + q, rw_X + s} = Y_{pr} + h_Y w_Y X_{qs} \quad (5)$$

An alternative formulation of Eq. (5) is $$Z_{tu} = Y_{t/h_X, u/w_X} + h_Y w_Y X_{t \% h_X, u \% w_X} \quad (6)$$

In Eq. (6) division is integer division with no remainder, and % denotes remainder or modulo. As one of ordinary skill in the art will appreciate upon reading this disclosure, straightforward calculation establishes that * is associative.

If X and Y are permutations of the non-negative integers less than $h_X w_X$ and $h_Y w_Y$, respectively, then it is easy to see that Z is a permutation of the non-negative integers less than $h_X w_X h_Y w_Y$. Visually, one can picture Z=X*Y as a tiling of $h_X \times w_Y$ copies of the multiple $h_Y w_Y X$, where the (p,q) copy is offset by Ypr.

Matrices X which are permutations of non-negative integers less than $h_X w_X$ can be used as halftone masks in the sense above: when the elements are divided by $h_X w_X$.

In the present invention, the halftone masks are a variant of the Bayer mask. (See generally: Henry Kang. *Digital Color Halftoning*. SPIE: The International Society for Optical Engineering, Bellingham, Wash., 1999; and Robert Ulichney. *Digital Halftoning*. The MIT Press, 1987.) which are herein incorporated by reference by reference in their entirety.

Modern, high-addressability, electrographic printers generally do not produce acceptable images using dispersed dot halftoning schemes. As with their aged, analogue ancestors, they produce better (more reliable, less noisy) images using clustered dot schemes—albeit with dot clusters at least as fine as 150 dpi.

To create a clustered dot halftone matrix suitable for the purposes of the present invention, a starting point is a base clustered dot halftone cell, C, such as one of the following:

$$C = \begin{bmatrix} 45 & 41 & 37 & 29 & 21 & 17 & 18 & 22 & 30 & 38 & 42 & 46 \\ 33 & 25 & 13 & 9 & 5 & 1 & 2 & 6 & 10 & 14 & 26 & 34 \\ 35 & 27 & 15 & 11 & 7 & 3 & 0 & 4 & 8 & 12 & 24 & 32 \\ 47 & 43 & 39 & 31 & 23 & 19 & 16 & 20 & 28 & 36 & 40 & 44 \end{bmatrix} \quad (7)$$

The cell C defined in Eq. (7) is a clustered dot mask with 48 threshold levels, growing out from the center of the cell. This 4×12 mask is constructed so that the four quadrants are translations or reflections of each other. Eq. (8) is provided in FIG. 8 due to its size. The cell structure of Eq. (7), as well as that of Eq. (8), gives us patterns of similar mask thresholds which will be repeated throughout an image at similar gray levels. This similarity and repetition allows for better compression ratios.

The cell $C^{(0)}$ defined in Eq. (8) is based on the cell C of Eq. (7): its upper left quadrant is twice the pattern of Eq. (7), and the other quadrants follow similar rules:

$$C^{(0)} = \begin{bmatrix} 2C & 190-2C \\ 191-2C & 2C+1 \end{bmatrix} \qquad (9)$$

By utilizing an equation such as Eq. (9) to create a matrix, the matrix formed will have 192 non-repeating thresholds. Eq. (8) gives such an example of a $C^{(0)}$ with 192 threshold levels. Although the arrangement of the starter cells C may be any suitable arrangement known in the art, the use of a cell such as $C^{(0)}$ creates a cluster arrangement at angles of 45 degrees which allows the patterns of clusters to be better hidden from human eyes, for example, which identify horizontal and vertical patterns more readily. Additionally, the matrix $C^{(0)}$ can be tiled a number of times to cover the entire image. For example, the matrix $C^{(0)}$ can be replicated 32 times in a single row and that row can then be replicated in 32 columns, thereby creating a larger matrix. Those skilled in the art will also realize that each value in this larger matrix can also have a non-repeated number through use of the * operator, more details of this process are given below with respect to Eq. (10).

In order to create a screen, $M=C^{(k)}$, that is large enough to cover image I' the equations $$C^{(k)} = C^{(k-1)} * A \qquad (10)$$

$$C^{(k)} = C * A * A * \ldots * A \qquad (11)$$

where A is the 2×2 matrix, $$\begin{bmatrix} 3 & 1 \\ 0 & 2 \end{bmatrix}$$

can be utilized.

The star operator as applied in Eq.(10) states that every matrix C be replaced in the A matrix. For example, when C is expanded to $C^{(0)}$ the matrix C was replicated four times and since in this embodiment non-repeatable numbers are utilized, each replication was assigned numbers according to Eq. (9). In this way, each replication of C had a slightly different set of thresholds, thereby expanding the total number of thresholds used by the halftoning process. Furthermore, Matrix A may be any size matrix known in the art and need not be symmetrical, but can be matrices such as 3×5, 8×24, etc, in addition to matrices such as 2×2 and 3×3.

In case the starter-cell is a halftone cell with a small number of thresholds (for instance the matrix of Eq. (11)), the tiling of an image with unaltered copies of that cell would produce unacceptable halftone images-they would have striping artifacts and look like "paint by number." The modification from tiling using matrices with a small number of repeated threshold values, to using matrices with non-repeating numbers or groups of matrices having non-repeating numbers, yields a huge number of thresholds. For example, if the starting cell $C^{(0)}$ has $\theta_0$ distinct thresholds, then $C^{(k)}$ has $\theta_k = 4^k \theta_0$ thresholds. Different starting cells can be used for different color planes to effect screen rotations.

Image Rearrangement and Compression

As with a variety of compression schemes, the data to be compressed is transformed so that some low-entropy aspect is evident. Such transformations will be reversible. In the present invention, both the mask and the converted image are considered to be one-dimensional lists of a length such as L=H×3W for embodiments wherein B' is used for compression, or L=H×W wherein B" is used. The image list can be sorted using the mask list as a sort key. Any mask can be utilized to provide the sort key. In various embodiments of the invention, the original H×3W mask is utilized, or is modified to fit the H×W format. For example, every third value of the mask may be used to sort the image data, thereby making the sort list H×W, or three consecutive values may be summed to create values that can be utilized as the sort key. The invention is not so limited. As stated above, this transformation puts mostly 0's at the beginning of the list and mostly 1's at the end. As one of ordinary skill in the art will appreciate upon reading this disclosure, the transformation is reversible.

In the present invention, the approach to compression is to rearrange the sorted L pixels (or N sections of the pixels) of an entire area, such as the entire image, into a rectangular array of dimension K×L/K; that is, L/K columns of length K. The image data can be from B' or can be from B" and therefore, as stated above, L can represent either the consolidated pixels of B" or the replicated pixels B'. These columns tend to begin with 0's and end with 1's when using B', and begin with 0's and end with 3's when using B", and have few transitions of value within themselves. Furthermore, the columns patterns are in a very skewed distribution. The values are very far from being equally likely.

Table 1 shows the compressions obtained for various column sizes K. The "entropy" is the number of bits needed to encode the average K-bit column assuming an optimal coding scheme. If the probability of the n-th column pattern is $P_n$, this notion of entropy is evaluated by:

$$-\sum_n P_n \log_2 P_n \qquad (12)$$

According to the teachings of the present invention, the compression ratios associated with various values of K in Table 1 are noted. The sorting and grouping operation puts together in single columns the pixels associated with a tiling of a component matrix X in the mask formation X*Y. More generally, if the starter-cell (such as the C cells), has $\theta_0$ thresholds, and the large cells $C^{(k)}$ have $\theta_k = 4^{(k)} \theta_0$ thresholds, then it is expected that the sweet spots for block sizes to be of the form $K=4^k \theta_0$. Image sorting using these masks as sort keys followed by the rearrangement into blocks with appropriate sizes K creates blocks of pixels corresponding to what are usually considered to be halftone cells (or fractions thereof) in the images.

TABLE 1

Compression ratios for the halftoned image of FIG. 1 using various block sizes. The column labeled patterns is the distinct pattern count for size = K. The column labeled bits is the estimate of the compressed file size (not counting the accompanying table).

| K | patterns | Entropy | bits | ratio |
|---|---|---|---|---|
| 2 | 4 | 1.20 | 117510 | 1.67 |
| 4 | 9 | 1.82 | 89460 | 2.20 |
| 6 | 16 | 2.26 | 74084 | 2.65 |
| 8 | 25 | 2.39 | 58730 | 3.35 |
| 12 | 47 | 2.95 | 48385 | 4.06 |
| 16 | 89 | 3.36 | 41256 | 4.77 |
| 24 | 83 | 3.70 | 30331 | 6.48 |
| 32 | 282 | 4.68 | 28757 | 6.84 |
| 36 | 1792 | 9.86 | 53850 | 3.65 |
| 48 | 249 | 5.20 | 21304 | 9.23 |
| 64 | 698 | 6.75 | 20738 | 9.48 |
| 128 | 820 | 8.55 | 13132 | 14.97 |
| 256 | 692 | 9.33 | 7165 | 27.44 |

Table 2 shows the 24-bit column patterns associated with a representative clustered dot image. In this example, the image data has been divided into 24 pixel sections with each bit in the 24-bit column pattern representing one bit (or one N segment of a bit, for example, in a 2-bit arrangement, each bit represents ⅓ of a pixel). The bulk—over 97%—of these patterns are 0's followed by 1's (shorthand: $0^m 1^{24-m}$). This can correspond to blocks of pixels in the original image that are relatively constant. But that is expected of images. The patterns not of the form $0^m 1^{24-m}$ can correspond to image regions with large gray-scale gradients and discontinuities. The count represents the number of times a particular pattern of 24 pixels, or N pixel segments, are identified in an image.

In Table 2, 83 different patterns are presented as having been identified in FIG. 1. Each of these patterns can be assigned a 7-bit code, yielding an immediate compression ratio of better than 3:1. However, the frequencies of the patterns are so skewed, that a further compression coding technique can be used to achieve an even greater compression ration. In some embodiments of the present invention, Huffman coding is used to achieve a compression ratio of 5:1. An accompanying table to permit decompression will add about 10% overhead to the compressed file.

| Non-recurring numbers | Number of Occurrences | 24-pixel pattern | Huffman Code |
|---|---|---|---|
| 1 | 1 | 000000000000001000111111 | |
| 2 | 1 | 000000000000001010111111 | |
| 3 | 1 | 000000000000111010111111 | |
| 4 | 1 | 000000000000111011111111 | |
| 5 | 1 | 000000000001000000001111 | |
| 6 | 1 | 000000000001000001001111 | |
| 7 | 1 | 000000000011000000010111 | |
| 8 | 1 | 000000000011000000111111 | |
| 9 | 1 | 000000000011000011111111 | |
| 10 | 1 | 000000000011000101001111 | |
| 11 | 1 | 000000000011000111111111 | |
| 12 | 1 | 000000000011001011111111 | |
| 13 | 1 | 000000000111000000001111 | |
| 14 | 1 | 000000000111000011111111 | |
| 15 | 1 | 000000001000000000111111 | |
| 16 | 1 | 000000001000000101001111 | |
| 17 | 1 | 000000001000000101111111 | |
| 18 | 1 | 000000001111000000001111 | |
| 19 | 1 | 000000001111000001001111 | |
| 20 | 1 | 000000001111000010111111 | |
| 21 | 1 | 000000001111001111111111 | |
| 22 | 1 | 000000001111111001111111 | |
| 23 | 1 | 000000010011111111111111 | |
| 24 | 1 | 000000011111001010111111 | |
| 25 | 1 | 000000011111001111111111 | |
| 26 | 1 | 000000101000111111111111 | |
| 27 | 1 | 000000101111111111111111 | |
| 28 | 1 | 000000111111001111111111 | |
| 29 | 1 | 000001010011111111111111 | |
| 30 | 1 | 000011010000011010111111 | |
| 31 | 1 | 000011010111111111111111 | |
| 32 | 1 | 000011111111000011111111 | |
| 33 | 1 | 000100101111000011111111 | |
| 34 | 2 | 000000000000000000000001 | |
| 35 | 2 | 000000000000000010110111 | |
| 36 | 2 | 000000000000000101001111 | |
| 37 | 2 | 000000000000000101011111 | |
| 38 | 2 | 000000000000011001111111 | |
| 39 | 2 | 000000000011000000000111 | |
| 40 | 2 | 000000000011001111111111 | |
| 41 | 2 | 000000000111110111111111 | |
| 42 | 2 | 000000001110011111111111 | |
| 43 | 2 | 000000010001111111111111 | |
| 44 | 2 | 000000010011111111111111 | |
| 45 | 2 | 000001010111111111111111 | |
| 46 | 3 | 000000000000001001111111 | 00101110000 |
| 47 | 3 | 000000000000011011111111 | 00101110001 |
| 48 | 3 | 000000000001000000000011 | 00101110010 |

-continued

| Non-recurring numbers | Number of Occurrences | 24-pixel pattern | Huffman Code |
|---|---|---|---|
| 49 | 3 | 000000000001000000000111 | 00101110011 |
| 50 | 3 | 000000000001000111111111 | 00101110110 |
| 51 | 3 | 000000000011000000001111 | 00101110111 |
| 52 | 4 | 000000000111011111111111 | 10001000110 |
| 53 | 4 | 000000001011111111111111 | 10001000111 |
| 54 | 4 | 000000010111111111111111 | 10001001000 |
| 55 | 5 | 000000000000000000001011 | 10001011111 |
| 56 | 7 | 000000000000000000010111 | 0010111011 |
| 57 | 7 | 000000000000000000110111 | 0010111110 |
| 58 | 7 | 000000000000000001001111 | 0010111111 |
| 59 | 7 | 000000000000000010111111 | 1000100010 |
| 60 | 9 | 000000000001001111111111 | 1000101110 |
| 61 | 9 | 000000000011011111111111 | 1000101110 |
| 62 | 13 | 000000000000000101111111 | 001011110 |
| 63 | 14 | 000000000000101111111111 | 100010000 |
| 64 | 19 | 000001111111111111111111 | 100010110 |
| 65 | 23 | 000000000000000101111111 | 00101100 |
| 66 | 24 | 000000000000000010111111 | 00101101 |
| 67 | 73 | 000000000000000000111111 | 1100010 |
| 68 | 83 | 000000000000000001111111 | 1100011 |
| 69 | 94 | 000000000000000000000011 | 001010 |
| 70 | 140 | 000000000000000011111111 | 100011 |
| 71 | 149 | 000000111111111111111111 | 11000 |
| 72 | 190 | 000000000011111111111111 | 00100 |
| 73 | 222 | 000000000000111111111111 | 10000 |
| 74 | 277 | 000000011111111111111111 | 10010 |
| 75 | 286 | 000000001111111111111111 | 10011 |
| 76 | 305 | 000000001111111111111111 | 11001 |
| 77 | 315 | 000000000001111111111111 | 11010 |
| 78 | 358 | 000000001111111111111111 | 11011 |
| 79 | 459 | 000000000000000111111111 | 0011 |
| 80 | 683 | 000000000000000000001111 | 000 |
| 81 | 1183 | 000000000000001111111111 | 101 |
| 82 | 1492 | 000000000000000000000111 | 111 |
| 83 | 1652 | 000000000000000111111111 | 01 |

Table 2. Frequencies of the 83 different (of the total of 8192) 24-bit column patterns of the clustered dot halftone. In this example, the most frequent 97% of the patterns are of the form $0^m 1^{16-m}$. The thick horizontal line occurs just above the first example not of that form.

Huffman Coding of the Column Patterns

The next problem to be addressed by the present invention, is how to assign short codes to the most frequent patterns and longer codes to the less frequent ones (cf. Morse code: the most frequent letter got the shortest codes). In some embodiments, this is achieved by Huffman code. (See generally, Khalid Sayood. *Introduction to Data Compression*. Morgan Kaufmann, 1996) which is herein incorporated by reference by reference in its entirety.

Huffman code converts a sequence of "messages" (in the present case, that sequence is the list of column patterns) into bit strings of varying lengths. It does this in such a way as to obviate any separator between codes for subsequent messages. A rough explanation of the encoding mechanism is the following. The collection of messages with their associated frequencies is successively reduced by combining the two messages with the lowest frequencies into a single message, but discriminating between them using the last bit, 0 for one, and 1 for the other. This continues until all messages have been combined into a single one. The Huffman codes for the 24-bit patterns are shown in Table 2 with their frequencies. The three most frequent patterns, making up 63% of the patterns, use 2 or 3 bit codes.

File Formats for Compressed Images

The pattern frequencies will be particular to a given image. Therefore, enough information must be stored with the compressed image to allow for decompression. There are several approaches to this.

One approach is to include a version of the frequency table (the first two columns of Table 2). According to the teachings of the present invention, the sorted pixels of B', for example, can be rearranged into blocks of 24 bits which provides a compression of 6.48. In this example, B' has a size H×3W which equals 256×(3×256) pixels. The image after compression (not including the tables needed for decompression, which is an overhead of about 10%) takes (256×256×3)/6.48=30,340 bits. The uncompressed multi-level image B" would take 256×256×2=131,072 bits. Therefore, the true compression ratio is 131,072/30340=4.32, for this example. If the image is enlarged, through methods such as pixel replication, bi-linear, or bi-cubic interpolation, these images can be compressed well, especially if larger blocks are utilized.

Software, Devices and Systems

Embodiments of the present invention include software, application modules, and computer executable instructions operable on devices and systems described herein. The embodiments, however, are not limited to any particular programming language. Thus, the invention includes a set of instructions executable by an information handling system, having processor and memory capabilities, to produce the embodiments described herein.

Figure 3:
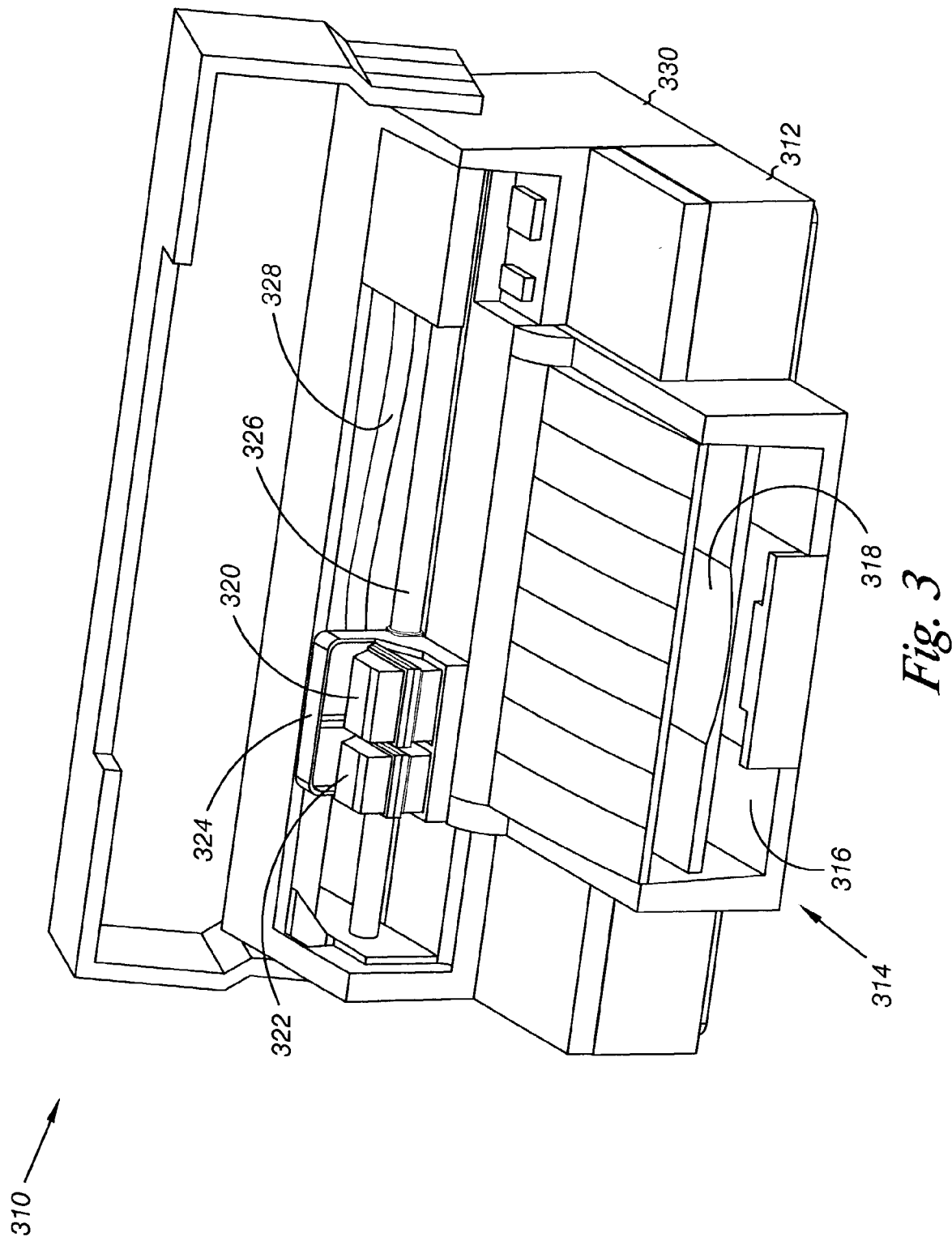
FIG. 3 illustrates an embodiment of a hardcopy printing device.

FIG. 3 illustrates an embodiment of a hardcopy printing device, here an inkjet printer 310, which may be used in an office or home environment for business reports, correspondence, desktop publishing, and the like. While it is apparent that the printer components may vary from model to model, the typical inkjet printer 310 includes a chassis 312 and a print medium handling system 314 for supplying a print medium 315, such as a sheet of paper, to the printer 310. In addition to paper 315, the print medium may be any type of suitable sheet material, such as card-stock, transparencies, Mylar, foils, and the like, but for convenience, the illustrated embodiment is described using paper as the print medium. The print medium handling system 314 includes a feed tray 316, an output tray 318, and a series of rollers (not shown) for delivering the sheets of paper from the feed tray 316 into position for receiving ink from an inkjet cartridge, such as a color ink cartridge 320 and/or a black ink cartridge 322. The illustrated color cartridge 320 is a tri-color pen, although in some embodiments (not shown), a group of discrete monochrome pens may be used, or a single monochrome black pen 322 may be used.

The cartridges or pens 320, 322 are transported by a carriage 324 which may be driven along a guide rod 326 by a conventional drive belt/pulley and motor arrangement (not shown). The pens 320, 322 may be conventional pens, which selectively deposit one or more ink droplets on a sheet of paper 315 in accordance with instructions received via a conductor strip 328 from a printer controller 330 located within chassis 312, for instance at the location shown in FIG. 3. The controller 330 generally receives instructions from a computer (not shown), such as a personal computer. A monitor (not shown) coupled to the computer may be used to display visual information to an operator, such as the printer status or a particular program being run on the computer. Personal computers, their input devices, such as a keyboard and/or a mouse device (not shown), and monitors are all well known to those skilled in the art.

Figure 4A:
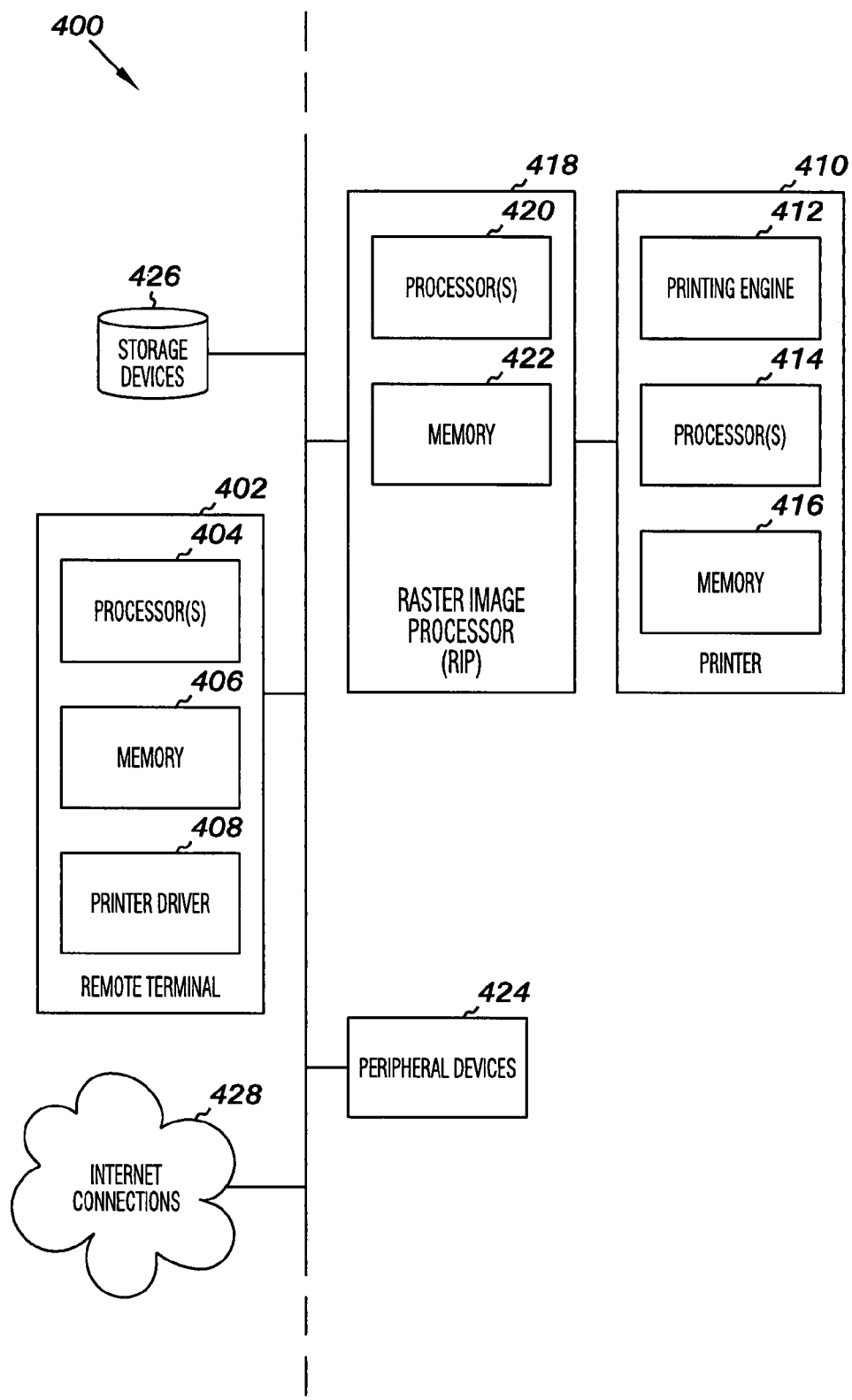
FIG. 4A illustrates a system environment according to an embodiment of the invention.

FIG. 4A illustrates a system environment 400 according to an embodiment of the present invention. As shown in FIG. 4A, the system includes a remote terminal 402. In various embodiments, the remote terminal 402 can include a desktop computer, laptop computer, a workstation, or other host computer as the same will be known and understood by one of ordinary skill in the art. The remote terminal 402 can include one or more processors 404 and one or more memory devices 406 suitable for running software and/or application modules thereon. In the embodiment shown in FIG. 4A, the remote terminal 402 includes a printer driver 408. As one of ordinary skill in the art will understand upon reading this description, a printer driver 408 is operable to create an instruction set for a print job which can be sent to a printing engine for rendering an image. Printer driver 408 includes any printer driver suitable for carrying out the aspects of the present invention. That is, the printer driver 408 can take output from applications running on remote terminal 402 and transform them into a print job.

In various embodiments of the present invention, the printer driver outputs an instruction set in Page Description Language (PDL). For purposes of this invention, a PDL is a device independent, high level language for instructing the printing engine of a printer to print text and graphics on a page. Two such languages are Adobe's Postscript and Hewlett-Packard's PCL (print control language).

As shown in FIG. 4A, remote terminal 402 is connected to a printer 410 via system 400. Printer includes a printing engine 412, or printer raster image processor 412. Printer 410 can include one or more processors 414 and one or more memory devices 416 suitable for running software and/or application modules thereon. As one of ordinary skill in the art will understand upon reading this description, the software and/or application modules include any software and/or application modules suitable for carrying out the aspects of the present invention.

As one of ordinary skill in the art will appreciate, system environment 400 includes a network having data links. Further, as one of ordinary skill in the art will appreciate, the network can include any number of network types including, but not limited to a Local Area Network (LAN), a Wide Area Network (WAN), and the like. Likewise, data links can include any combination of direct wired and wireless connections, including by not limited to electrical, optical, and RF connections.

In the embodiment of FIG. 4A, remote terminal 402 is connected to printer 410 via an external raster image processor (RIP) 418. That is, a RIP which is external to the printer 410. RIP 418 includes one or more processors 420 and one or more memory devices 422 suitable for running software and/or application modules thereon. However, those of ordinary skill in the art will understand upon reading this disclosure and from practicing the invention that the memory for temporary storage and data communication lines may be solely within a printer or other device or may be distributed among and between two or more components, such as printers, computers, and the like.

As one of ordinary skill in the art will understand upon reading this description, the software and/or application modules include any software and/or application modules suitable for carrying out the aspects of the present invention. Such software and/or application modules can be resident in one location or in several and even many locations, such as in a distributed computing environment, throughout a system.

Further, as shown in the embodiment of FIG. 4A, a system 400 can include other peripheral devices 424, storage devices 426, and Internet connections 428 as the same can be included within a network.

Figure 4B:
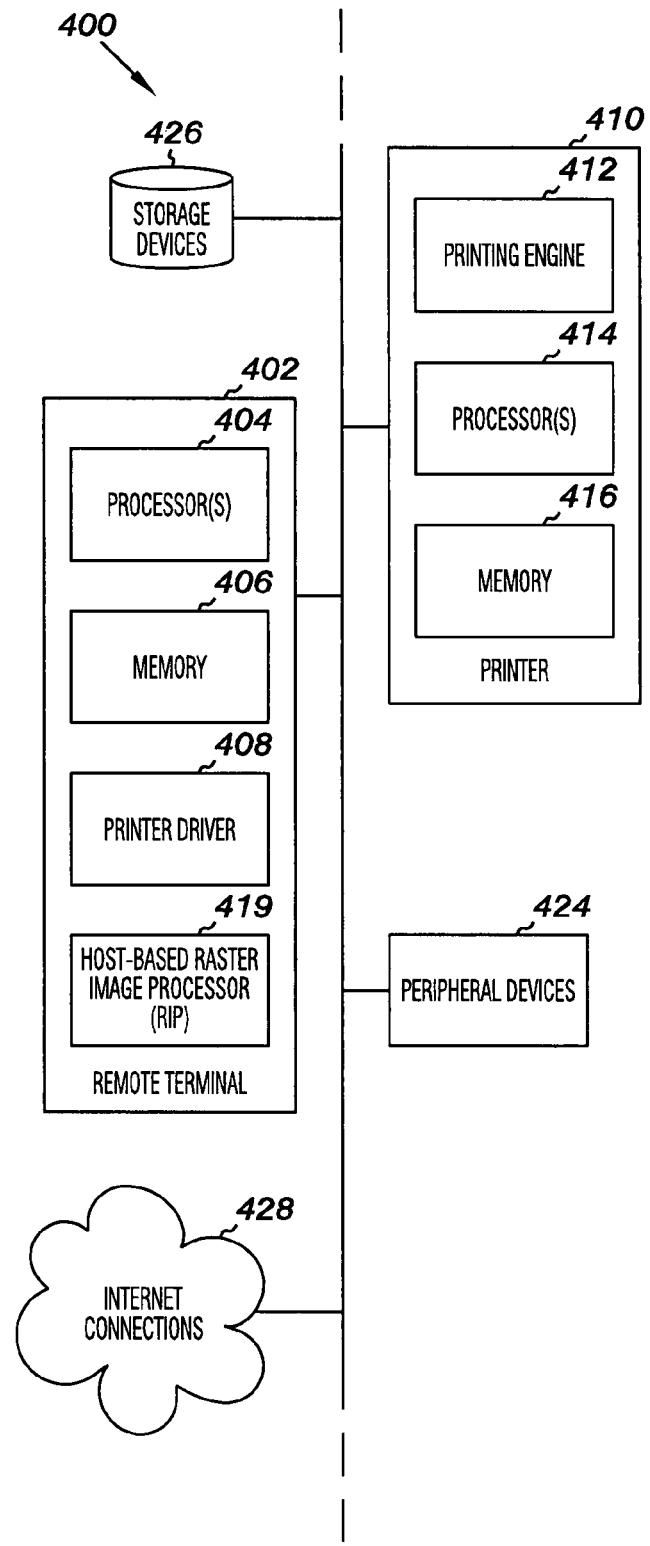
FIG. 4B illustrates another system environment according to an embodiment of the invention.

FIG. 4B illustrates another system environment 401 according to the teachings of the present invention. The system 401 shown in FIG. 4B is similar to the system 400 shown in FIG. 4A and is operable to perform various aspects according to the teachings of the present invention. However, in the embodiment of FIG. 4B, a host-based RIP 419 is provided. In one embodiment, as shown in FIG. 4B, host-based RIP 419 is included within remote terminal 402. As one of ordinary skill in the art will appreciate upon reading this disclosure, host-based RIP 419 is similar to the external RIP shown in FIG. 4A in that it is operable to perform various aspects of the present invention.

As stated above, printer driver 408 includes any printer driver which is suitable for carrying out the aspects of the present invention. That is, the printer driver 408 can take output from applications running on the remoter terminal 402 and transform them into a print job.

In various embodiments of the present invention, the printer driver outputs an instruction set in Page Description Language (PDL). According to the various aspects, the printer driver 408 outputs the PDL to either an external RIP 418 (as shown in FIG. 4A) or to a host-based RIP 419 (shown in FIG. 4B). As stated above, RIPs are designed to generate output image data based on a compact input representation such as a PDL instruction set. Each page contained in a PDL instruction set can be parsed and operated upon by software to further process, resolve, and/or interpret the instruction set commands of a print job.

A traditional dedicated RIP will output a video-ready-data (VRD) instruction set. The VRD format includes an instruction set which has been PDL parsed, rendered, color converted, halftoned, and compressed in a format a printer can take as an image directly to a sheet of paper. Essentially, in the VRD format, no additional instruction set processing is performed by the printing engine to transfer the image to the sheet of paper. The present invention provides novel methods, devices, and systems for creating and compressing halftoned images. The VRD format typically creates high network traffic on a system, such as system 400 of FIG. 4A or system 401 of FIG. 4B. The novel methods, devices, and systems for creating and compressing halftoned images contained herein alleviate this network traffic as well as reducing storage requirements.

Figure 5:
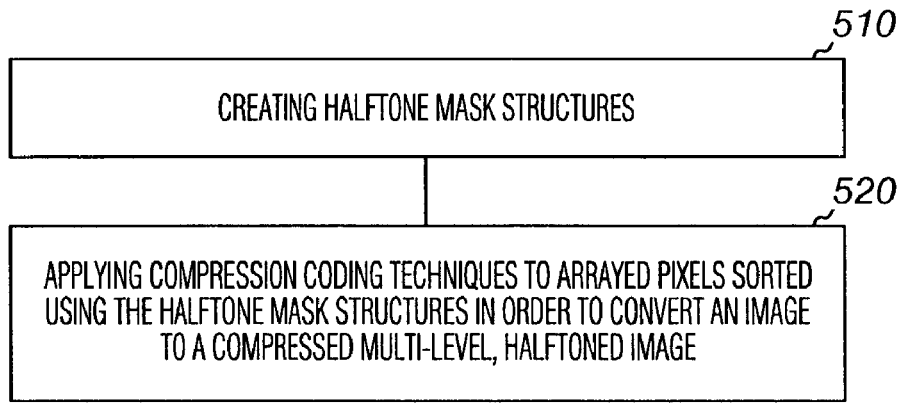
FIG. 5 is a flow chart illustrating a method according to an embodiment of the invention.
Figure 6:
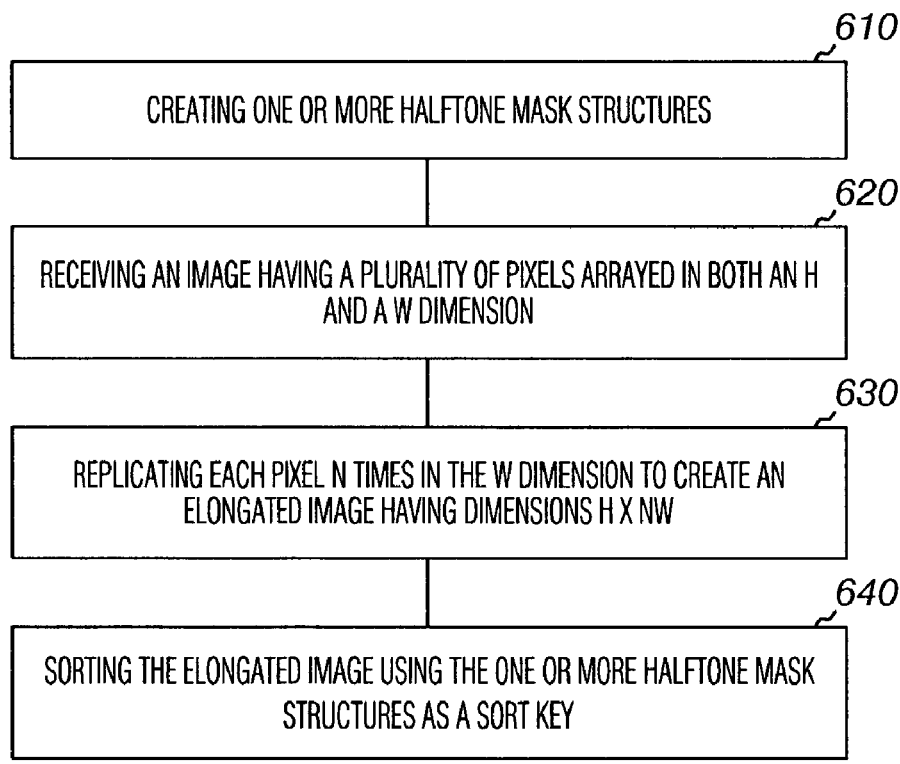
FIG. 6 is a flow chart illustrating another method according to an embodiment of the invention.
Figure 7:
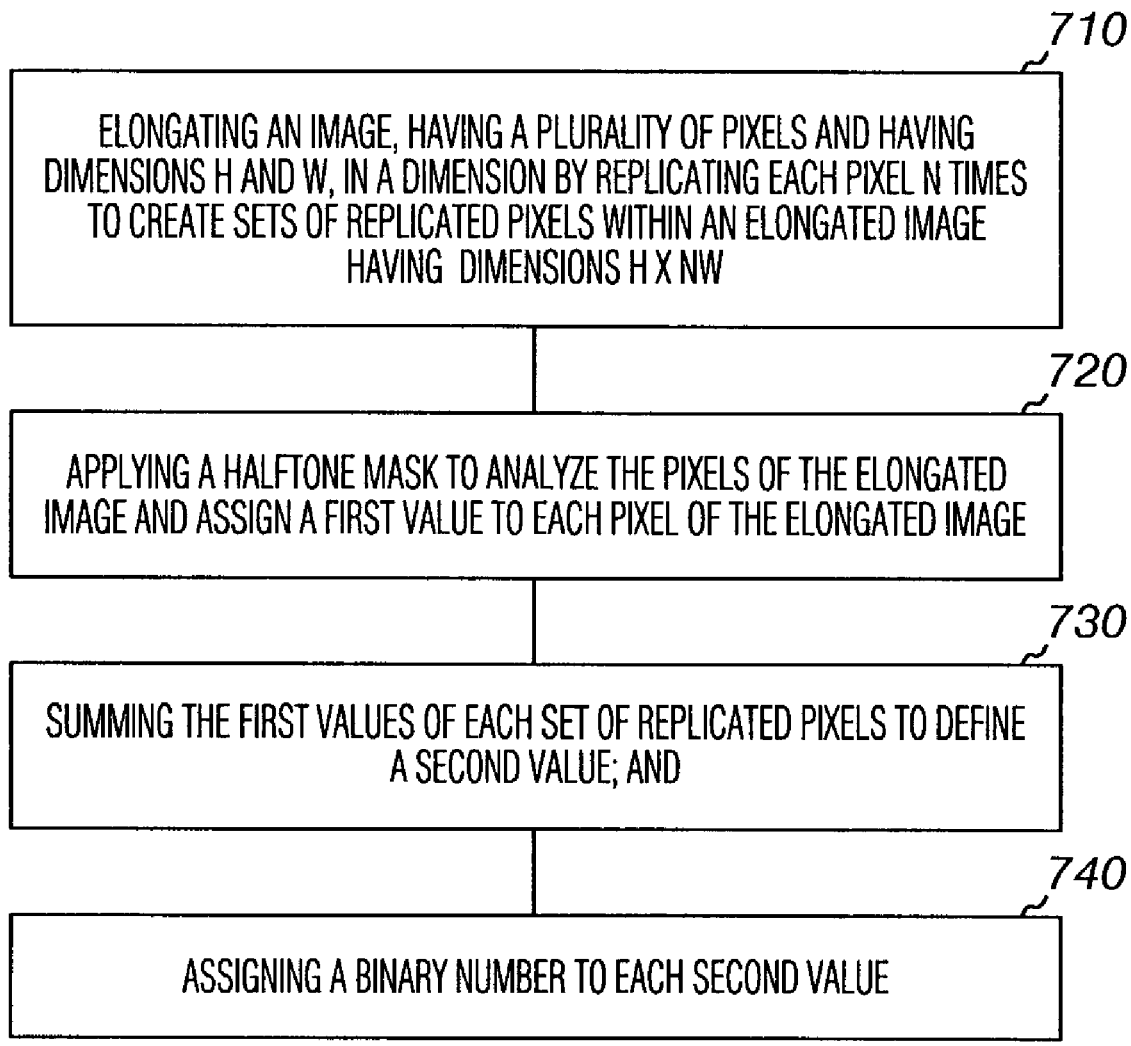
FIG. 7 is a flow chart illustrating another method according to an embodiment of the invention.

FIGS. 5-7 are block diagrams illustrating various method aspects of the invention. As one of ordinary skill in the art will understand, the methods can be performed by software, application modules, and computer executable instructions operable on the systems and devices shown herein or otherwise. The invention, however, is not limited to any particular operating environment or to software written in a particular programming language.

FIG. 5 is a block diagram illustrating one method according to an embodiment of the present invention. It should be understood by those of skill in the art that the elements of each method claim do not need to be executed in the order shown unless it is stated herein that such order is explicitly required. As shown in FIG. 5, a method for compressing images is provided. The method includes creating halftone mask structures at block 510. In various embodiments, creating halftone mask structures includes creating halftone mask structures with non-repeated threshold values that permit a reversible rearrangement of pixels into groups with highly skewed distribution.

The method further includes applying compression coding techniques to arrayed pixels sorted using the halftone mask structures in order to convert an image to a compressed multi-level, halftoned image at block 520. In some embodiments, applying compression coding techniques includes applying a compression coding techniques which give a 5 or greater factor file size compression ratio. In various embodiments, applying compression coding techniques to convert an image to a compressed multi-level, halftoned image includes providing lossless halftone image compression. In some embodiments, applying compression coding techniques includes applying Huffman coding techniques.

FIG. 6 is a block diagram illustrating one method according to an embodiment of the present invention. As shown in FIG. 6, a method for image handling is provided. The method includes creating one or more halftone mask structures at block 610. In some embodiments, creating one or more halftone mask structures includes creating matrices which are permutations of non-negative integers less than $h_x w_x$.

The method includes receiving an image having a plurality of pixels arrayed in both an H and a W dimension at block 620. The method includes replicating each pixel N times in the W dimension to create an elongate image having dimensions H×NW in block 630. Those skilled in the art will understand from reading this disclosure and practicing the invention that the elements H and W in the equations included herein can each represent either the height or width dimension of an image and that the present invention is not limited to the elongation of the width dimension. The method further includes sorting the elongated image using the one or more halftone mask structures as a sort key in block 640. In some embodiments, the method further includes arranging sorted pixels in an array. In various embodiments, the one or more halftone masks are at least H×NW in dimension. In various embodiments, the element N equals the highest value that can be expressed by a multi-bit structure. For example, in a two-bit structure, 3 is the highest value (for among 0, 1, 2, and 3) that can be expressed and, therefore, N=3.

The method can also include using a skewed distribution of column patterns in the array to convert an image to a compressed multi-level, halftoned image. In various embodiments, using a skewed distribution of column patterns in the array to convert an image to a compressed multi-level, halftoned image includes providing a lossless compressed image. In various embodiments, the method includes using a skewed distribution of column patterns in the array and includes applying Huffman coding techniques.

FIG. 7 is a block diagram illustrating one method according to an embodiment of the present invention. As shown in FIG. 7, the method includes elongating an image (having a plurality of pixels and having dimensions H and W) in a (i.e. one or more) dimension by replicating each pixel N times to create sets of replicated pixels (e.g. $a_1, a_2, a_3$). In one embodiment, the elongated image will have the dimensions H×NW as shown at block 710 in the embodiment of FIG. 7. The method includes applying a halftone mask to analyze the pixels of the elongated image and assigning a first value to each pixel of the elongated image in block 720. In various embodiments, the mask can be constructed from a set of non-recurring numbers. In various embodiments, the halftone mask is constructed from a plurality of masks tiled over the elongated image. In various embodiments, applying the halftone mask to sort a multi-level image includes sorting a multi-level image which is a one-dimensional list having a length (L) equal to hw. Likewise, applying each halftone mask includes applying a mask which is a one-dimensional list having a length (L) equal to hw. At block 730, the method includes summing the first values of each set of replicated pixels to define a second value. For example, $a_1$ is assigned a first value when a halftone mask is applied (e.g. a 0 or a 1). A second value is defined once the values of $a_1, a_2,$ and $a_3$ (in a two-bit embodiment) are summed. The method also includes assigning a binary number to each second value, at block 740.

In various embodiments, the method further includes rearranging sorted pixels into a rectangular array. In various embodiments, rearranging of sorted pixels is accomplished by sorting L pixels into a rectangular array of dimensions K×L/K, the array having L/K columns of length K. In various embodiments, rearranging sorted pixels into a rectangular array of dimensions K×L/K creates blocks corresponding to halftone cells in the one or more multi-level images. In various embodiments, rearranging sorted pixels into a rectangular array of dimensions K×L/K creates column patterns with over 90 percent of column patterns beginning a 0 ending with a 1.

The method can also include assigning short codes to most frequent column patterns and assigning longer codes to less frequent column patterns. The method can also include providing information for decompressing the assigned codes. In various embodiments, providing decompression information for the assigned codes includes including a version of a frequency table with a compressed image.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of the various embodiments of the invention. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure in not to be interpreted as reflecting an intention that the embodiments of the invention require more features than are expressly recited in each claim. Rather, as the following claims reflect, inventive subject matter can reside in less or fewer than all features of a single disclosed embodiment. Thus, the following claims are hereby incorporated into the Detailed Description, with each claim standing on its own as a separate embodiment.

What is claimed:

1. A method for image handling, comprising:
   creating one or more halftone mask structures;
   receiving an image having a plurality of pixels arrayed in both an H and a W dimension;
   replicating each pixel N times in the W dimension to create an elongated image having dimensions H.times.NW;
   sorting the elongated image using the one or more halftone mask structures as a sort key.

2. The method of claim 1, wherein the method further includes:
   arranging sorted pixels in an array; and using a skewed distribution of column patterns in the array to convert an image to a compressed multi-level, halftoned image.

3. The method of claim 1, wherein the one or more halftone masks are at least H.times.NW in dimension.

4. The method of claim 1, wherein using a skewed distribution of column patterns in the array includes applying Huffman coding techniques.

5. The method of claim 1, wherein N equals the highest value that can be expressed by a multi-bit structure.

6. The method of claim 5, wherein the multi-level bit structure is 2-bits and therefore N=3.

* * * * *

UNITED STATES PATENT AND TRADEMARK OFFICE
CERTIFICATE OF CORRECTION

PATENT NO. : 7,444,027 B2 Page 1 of 1
APPLICATION NO. : 10/303180
DATED : October 28, 2008
INVENTOR(S) : Peter G. Anderson It is certified that error appears in the above-identified patent and that said Letters Patent is hereby corrected as shown below:

In column 5, line 10, delete "firm" and insert -- from --, therefor.

In column 6, line 18, delete "$h_z=h_xw_y$" and insert -- $h_z=h_xh_y$ --, therefor.

Signed and Sealed this

Thirty-first Day of March, 2009

JOHN DOLL
*Acting Director of the United States Patent and Trademark Office*